(12) United States Patent
Seul et al.

(10) Patent No.: US 11,533,384 B2
(45) Date of Patent: Dec. 20, 2022

(54) PREDICTIVE PROVISIONING OF CLOUD-STORED FILES

(71) Applicant: International Business Machines Corporation, Armonk, NY (US)

(72) Inventors: Matthias Seul, Pleasant Hill, CA (US); Alexandr Pavlovich Korchemniy, Emeryville, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/824,860

(22) Filed: Mar. 20, 2020

(65) Prior Publication Data
US 2021/0297502 A1 Sep. 23, 2021

(51) Int. Cl.
G06F 15/16 (2006.01)
H04L 67/5681 (2022.01)
H04L 67/06 (2022.01)
H04L 67/561 (2022.01)

(52) U.S. Cl.
CPC .......... *H04L 67/5681* (2022.05); *H04L 67/06* (2013.01); *H04L 67/561* (2022.05)

(58) Field of Classification Search
CPC .. H04L 67/2847; H04L 67/2804; H04L 67/06
See application file for complete search history.

(56) References Cited

U.S. PATENT DOCUMENTS

| | | | |
|---|---|---|---|
| 8,799,413 B2* | 8/2014 | Taylor | G06F 11/2089 709/219 |
| 9,792,298 B1* | 10/2017 | Taylor | G06F 16/1844 |
| 9,852,147 B2 | 12/2017 | von Muhlen et al. | |
| 10,264,039 B2 | 4/2019 | Novak et al. | |
| 2010/0306339 A1 | 12/2010 | Ling et al. | |
| 2013/0132509 A1* | 5/2013 | Styles | G06F 16/639 709/217 |
| 2014/0006465 A1* | 1/2014 | Davis | G06F 16/183 707/827 |
| 2014/0324945 A1 | 10/2014 | Novak et al. | |
| 2014/0330874 A1* | 11/2014 | Novak | H04L 67/1097 707/827 |
| 2017/0078362 A1* | 3/2017 | Schneider | G06F 16/13 |
| 2018/0084044 A1 | 3/2018 | Nichols et al. | |
| 2018/0084045 A1 | 3/2018 | Nichols et al. | |
| 2019/0014160 A1* | 1/2019 | Karande | G06F 16/14 |
| 2020/0159391 A1* | 5/2020 | Kleinpeter | G06F 3/04842 |

FOREIGN PATENT DOCUMENTS

| | | |
|---|---|---|
| CN | 103064637 A | 4/2013 |
| CN | 103067479 A | 4/2013 |
| CN | 105227598 A | 1/2016 |
| CN | 108280196 A | 7/2018 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

Primary Examiner — Cheikh T Ndiaye
(74) Attorney, Agent, or Firm — Peter J. Edwards

(57) ABSTRACT

A computer system with access to remote files stored on a remote system can predict that a portion of a remote file is likely to be necessary. The computer system may download the portion of the remote file to a local file and update metadata of the local file to reflect the downloaded portion.

25 Claims, 7 Drawing Sheets

PREDICTIVE PROVISIONING OF CLOUD-STORED FILES

BACKGROUND

The present disclosure relates to file storage, and more specifically, to predictively downloading cloud-stored files to a local file system.

Cloud storage is becoming increasingly commonplace in both commercial and personal settings. With cloud-synced storage applications, a user's cloud-stored files and/or data can be automatically downloaded to local storage when a user installs the cloud-synced storage application on a new computer.

However, automatically downloading every file stored in the user's cloud is likely to needlessly consume bandwidth and local storage space. For example, if a user's cloud includes multiple important documents as well as several Terabytes (TB) of video files, then automatically downloading all files may, depending upon configuration of the user's new local machine and internet connection, take between hours and several days (or even longer) and completely fill up the user's new machine's local storage, possibly before the important documents are downloaded. Thus, many cloud-sync storage applications implement various methodologies to prevent needlessly downloading significant amounts of data, such as providing a listing of files and only downloading a file upon receiving a read instruction (such as when a user attempts to open a file that is currently cloud-only, i.e., no local copy currently exists).

This also enables cloud systems to serve as "remote storage"—a user may upload files to a cloud and delete local copies of the files, thus freeing up storage space on the user's local system. If the user desires to utilize the file once again, the cloud-sync storage application initiates a download of the file "back" to local storage, enabling use.

However, many types of read instruction do not require access to the entire file. For example, many file explorer systems automatically generate thumbnail images for video files simply by using a predetermined frame of the video (e.g., the fifth frame). This single frame may be read from the video file (a process initiated via a read request), possibly compressed and/or resized, and then displayed as a thumbnail, at which point no further information about the file may be necessary. Thus, a read request seeking access to a large video file (e.g., a several-GB file) may only actually need to read a few kilobytes (kB).

As conventional systems may respond to a read request targeting a file by initiating a download of the entire file, they may waste significant computational resources. Continuing with the above example, conventional systems may download an entire video file even when only a single frame of the video is needed at the time.

SUMMARY

Some embodiments of the present disclosure can be illustrated as a first method. The first method comprises identifying a remote file stored on a remote computing system. The first method further comprises predicting that a portion of the remote file is likely to be subject to a future read request. The first method further comprises downloading the predicted portion of the remote file to a local file. The first method further comprises updating metadata of the local file to map a local portion of the local file to the predicted portion of the remote file. This first method advantageously improves efficiency of a remote file storage computing system by predictively downloading portions of remotely stored files, potentially reducing a magnitude of data downloaded when a remotely stored file is requested.

Some embodiments of the present disclosure can be illustrated as a second method. The second method comprises the first method as discussed above. The second method further comprises receiving a first read request. In the second method, the "identifying" (described above with reference to the first method) is based at least on a target of the first read request. In the second method, the "predicting" (described above with reference to the first method) is based at least on the first read request. This second method advantageously improves efficiency of a remote file storage computing system by downloading portions of a remotely stored file that are predicted to be necessary (rather than the entire file) in response to a request to read that file.

Some embodiments of the present disclosure can be illustrated as a third method. The third method comprises the second method as discussed above. The third method further comprises determining, based at least on an application profile database, a requesting application that initiated the first read request. In the third method, the "predicting" (described above with reference to the first method and the second method) is further based at least on the requesting application. This third method advantageously provides additional accuracy in the predicting by basing the prediction of the portion to download on the application requesting the file.

Some embodiments of the present disclosure can be illustrated as a fourth method. The fourth method comprises the third method as discussed above. The fourth method further comprises receiving a second read request targeting a targeted portion of the remote file. The fourth method further comprises updating the application profile database based at least on the predicted portion and the targeted portion. This fourth method advantageously enables enhanced accuracy in determining the correlation between the application's identity and the predicted portion.

Some embodiments of the present disclosure can also be illustrated as a computer program product comprising a computer readable storage medium having program instructions embodied therewith, the program instructions executable by a computer to cause the computer to perform any of the methods discussed above. This advantageously improves efficiency of a remote file storage computing system by predictively downloading portions of remotely stored files, reducing a magnitude of data downloaded when a remotely stored file is requested.

Some embodiments of the present disclosure can be illustrated as a system. The system may comprise memory and a Central Processing Unit (CPU). The CPU may be configured to perform any of the methods discussed above. This advantageously improves efficiency of a remote file storage computing system by predictively downloading portions of remotely stored files, reducing a magnitude of data downloaded when a remotely stored file is requested.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
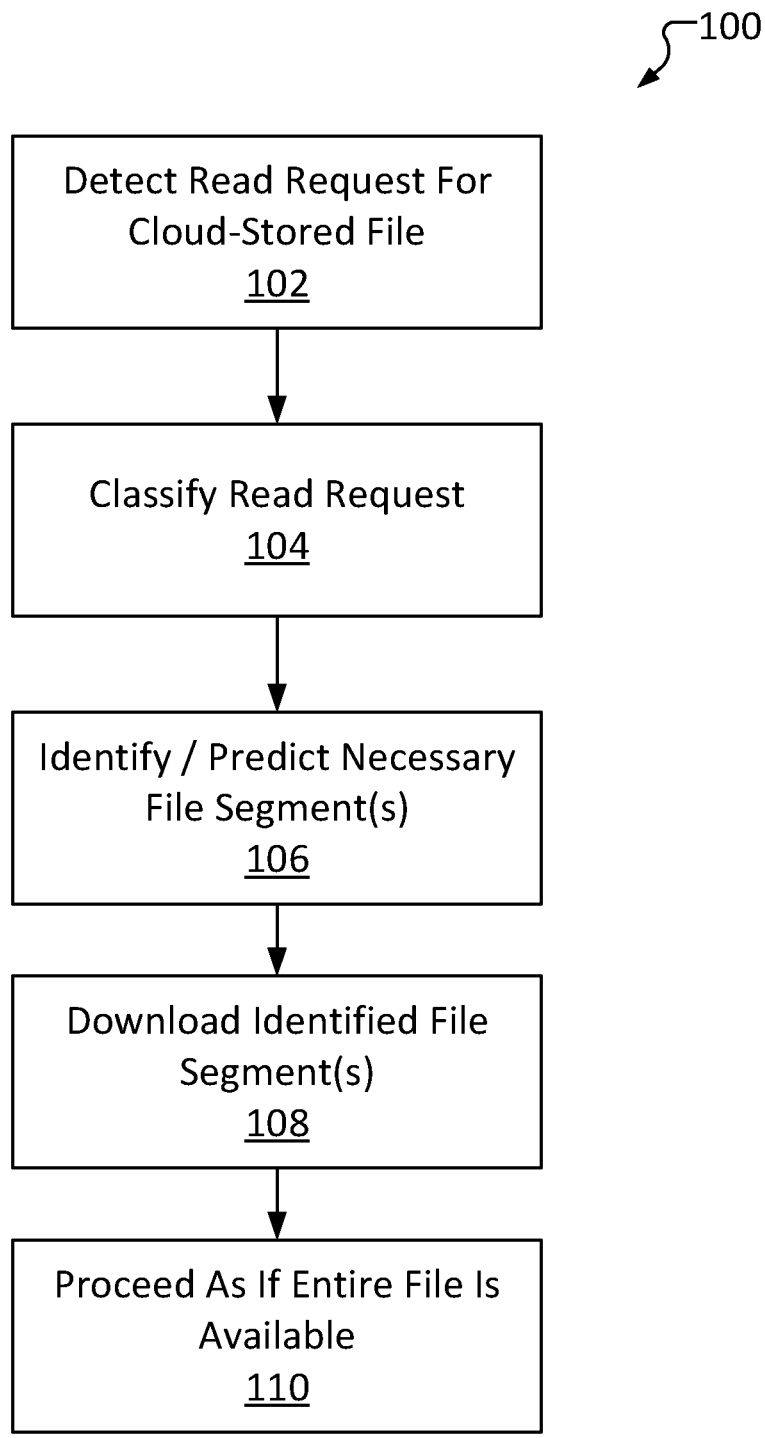
FIG. 1 illustrates a method of predictively provisioning cloud-stored files in response to a read request targeting one of the cloud-stored files, according to several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to a system and method to predictively provision one or more cloud-stored files. More particular aspects relate to a system to detect a read request, classify a type of the read request, predict a portion of a cloud-stored file necessary to satisfy the read request, and download the predicted portion of the cloud-stored file.

Throughout this disclosure, reference is made to "cloud-sync storage applications." As used herein, "cloud-sync storage application" refers to an application executing on a client computing system ("client device") to enable the client device to upload one or more files to a cloud-based computing system ("cloud") and download files from the cloud via, for example, the Internet. Once the files are uploaded, the client device may delete local copies of the uploaded files but may later download the cloud-stored files back to local storage. This enables the client device to free up local storage space while still having access to the files if needed. As will be understood by one of ordinary skill in the art, the systems and methods described herein are not necessarily restricted to use with cloud-based systems; generic remote file storage can similarly be improved in accordance with the present disclosure.

Cloud-sync storage applications typically provide a listing of files stored in the cloud, any of which may also be stored locally. This listing is generally implemented as a series of "placeholder" files (typically files only containing minimal metadata about the actual file, such as a filename, file size, last modified date, etc.). From a perspective of a user of the client device, the files may be presented as if they are all stored locally, or they may be presented with markers to distinguish between files that are stored both in the cloud and locally in contrast to files that are currently "cloud-only." As used herein, the phrase "cloud-only" refers to a file which is stored on a cloud system but is not stored on a local storage device (i.e., no local copy of the cloud-only file exists). A cloud-only file may typically be downloaded to local storage on-demand via a cloud-sync storage application, after which the file would no longer be referred to herein as "cloud-only." Note that "cloud-only" is not synonymous with "placeholder"; as a clarifying example, when considering a 3 GB video file stored on the cloud but not stored on the client device, the "cloud-only" file refers to the 3 GB video file itself stored on the cloud, while an associated ~1 kB "placeholder" file is stored locally on the client device to represent the video file (listing metadata such as, for example, its filename, filetype, etc.). Thus, if a user of the client device wishes to open the "cloud-only" file, the user may double-click on the "placeholder" file.

Notably, while the present disclosure refers extensively to cloud-stored files, some entities may utilize servers that, being located on an end-user's premises, are geographically distributed. These and other similar use cases may be considered a "private cloud" implementation. The present disclosure may advantageously improve performance of such systems, as will be understood by one of ordinary skill in the art.

Throughout this disclosure, reference is made to "read requests." As used herein, a "read request" refers to a category of digital requests, all of which are seeking access to a file. A read request may be initiated by a user action, such as by a user double-clicking on an icon representing the file (this may be referred to as an "open" request, which is a type of read request). Read requests may also be initiated automatically by applications executing on the client device without direct user input, such as a file explorer program attempting to automatically generate a thumbnail for a video file.

Read requests are typically an operating system (OS) or file explorer's first step in the process of accessing a file. Notably, file explorer systems do not necessarily disclose what portion(s) of a file will be needed as part of an initial read request. Instead, in typical computer systems, a read request identifying an associated file may be sent to a storage controller. The storage controller may react to the read request by locating the identified file and responding with an acknowledgment to indicate that the requested file is ready to be read. The file explorer may then proceed with a more specific request (i.e., "return bits 300-700 of the file").

Further, many read requests do not require access to the entire file. For example, continuing with the "thumbnail" example above, many file explorer systems automatically generate thumbnail images for video files simply by using a predetermined frame of the video (e.g., the fifth frame). This single frame may be read from the video file (a process initiated via a read request), possibly compressed and/or resized, and then displayed as a thumbnail, at which point no further information about the file may be necessary. Thus, a read request seeking access to a large video file (e.g., a several-GB file) may only actually need to read a few kilobytes (kB).

Cloud-sync storage applications may monitor for read requests which seek access to cloud-only files. When a conventional cloud-sync storage application detects a read request directed toward a cloud-only file, it may respond by initiating a download of the file, followed by responding to the request with an acknowledgment, indicating that the file is ready to be read.

However, systems and methods consistent with the present disclosure enable determining, predicting, estimating, or otherwise approximating which portions of a file subject to a read request are likely to actually be necessary and downloading those portions. By downloading only certain parts of the file based on this prediction, systems and methods consistent with the present disclosure may advantageously conserve significant resources (e.g., bandwidth, local storage space, processing resources, energy, time, etc.). For example, if the file in question is a large video file and the read request is determined to only require a single frame, merely downloading the frame instead of the entire video file may save several GB of bandwidth.

In order to determine which portions of a file subject to a read request should be downloaded, aspects of a cloud-sync storage application consistent with the present disclosure may classify a read request based on contextual information. Contextual information may include information describing, for example, an application initiating the read request (such as a file explorer, an image editor, etc.) and/or a client system (such as uptime, recent operations such as downloads, installations, etc.).

Upon detecting a request to read a cloud-only file (such as a request to read a placeholder file of a corresponding cloud-only file), a cloud-sync storage application may leverage contextual information to determine and/or classify a nature of the read request in order to determine which portions of the cloud-only file should be downloaded. Contextual information may include information describing, for example, an application initiating the read request (such as a file explorer, an image editor, etc.) and/or a client system (such as uptime, recent operations such as downloads, installations, etc.). Examples of contextual information that may be used by the cloud-sync storage application include application identity, system configuration information, historical request data, preset/hard-coded patterns, etc.

For example, a first application may frequently initiate read requests only to then read a small specific portion of a file, while a second application may frequently initiate read requests that require a significant portion of the file or even the entire file. These profiles may be developed over time and monitored via an application profiler, as described in further detail below. Based at least in part on information gleaned from the application profiler, a read request may be classified into one of several categories. A read request initiated by the first application may be more likely to only require access to the small specific portion of the file. In this case, a cloud-sync storage application consistent with the present disclosure may anticipate that the entire file is not necessary to fulfill the request, and thus may initiate a download of the small specific portion of the file. On the other hand, a read request initiated by the second application may be more likely to require the entire file. Thus, depending upon the application from which the read request originates, the cloud-sync storage application may identify and download specific portions of a file (or, if deemed necessary, the entire file).

It is to be understood that the aforementioned advantages, as well as other advantages described herein, are example advantages and should not be construed as limiting. Embodiments of the present disclosure can contain all, some, or none of the advantages while remaining within the spirit and scope of the present disclosure.

FIG. 1 illustrates a predictive cloud-stored file provision method 100 consistent with several embodiments of the present disclosure. In some embodiments, the method 100 may be performed by hardware, firmware, software executing on a processor, or any combination thereof. For example, method 100 may be performed by a cloud-sync storage application consistent with the present disclosure. Method 100 includes detecting a read request seeking (or directed towards) a cloud-stored file at operation 102. Operation 102 may include, for example, cloud-sync storage application monitoring requests initiated by applications executing on a client device. The cloud-sync storage application may maintain a list of cloud-stored files (particularly "cloud-only" files) via local storage of corresponding placeholder files. Further, the cloud-sync storage application may be configured with a privilege level enabling it to monitor instructions or requests initiated by relatively low-level applications such as file explorers or the operating system itself. If an application executing on a client device (such as, for example, a file explorer) initiates a read request with a file identifier of a placeholder file corresponding to a cloud-only file, the cloud-sync storage application detects this request at operation 102. In some embodiments, the cloud-sync storage application may be an application, service, or set of functions included in an operating system.

Method 100 further includes classifying the read request at operation 104. In general, operation 104 includes determining a "true" origin of the read request as well as determining a purpose of the read request in order to approximate which portion(s) of the file in question actually need to be downloaded in order to satisfy the request. For example, a read request may be classified as an "OPEN" request or an "AUX" request. An OPEN request may be associated with opening the file in question (requiring downloading the entire file), while an AUX request may be associated with any other type of read request. Examples of AUX requests may include a request seeking to generate a thumbnail (a "thumbnail request") or a request seeking file metadata (a "metadata request" seeking information such as size, date, author, etc.). Other classifications are also possible, as well as more specific classifications (for example, a first type of metadata request may require an author and file size, while a second type of metadata request may require an author, filename, and date of creation).

The read request may be classified at operation 104 based on contextual information. "Contextual information," as used herein, may include the context of the read request, gleaned from sources other than the read request itself. For example, contextual information may include metadata of the file, identity of an application initiating the read request (the "requesting application"), hardware configuration of a client system from which the request originates, time/date of the request, previous operations, historical trends, etc. Contextual information may be determined based on, for example, output of one or more profilers, as described in further detail below.

The classification may be selected from a list of possible classifications based on a weighted analysis. For example, various contextual information may be associated with different weights, resulting in a list of possible classifications, each having a predicted likelihood. As an example, if the requested cloud-only file is a video file and the requesting application is a file explorer, this contextual information may weight and/or bias the determination of operation 104 towards a thumbnail request. If, however, the requesting application is a media player, a thumbnail request may be considered less likely.

In some embodiments, the classification having the highest predicted likelihood is selected. In some embodiments, if there is no "clear winner" (for example, if no potential classification has a likelihood greater than a threshold or no potential classification has a significant enough "margin of victory" compared to others) a system performing method 100 may consider the classification unsuccessful and initiate a download of the entire file (at which point method 100 would end). In some embodiments, when a classification attempt yields no clear winner, a classification may be selected at random. In some embodiments, if a classification attempt yields no clear winner, a system performing method 100 may adjust weights of various types of contextual information and re-evaluate.

Method 100 further includes identifying and/or predicting necessary file segments at operation 106. Operation 106 may include, for example, determining a range of bits of a cloud-only file that a requesting application is likely to require. For example, in some embodiments a system performing method 100 may determine that the first 300 kB are most likely to be requested.

In some embodiments, the determination made at operation 106 may be based on the classification of a detected read request determined at operation 104. In some embodiments, a system performing method 100 may consider, as part of operation 106, contextual information such as that described above. For example, if the read request is classified as a thumbnail request, operation 106 may include analyzing metadata of the file to determine a location of a particular keyframe. On the other hand, in some embodiments, the prediction at operation 106 is based solely on the classification of the request. For example, a system performing method 100 may be "hard-coded" to identify the necessary portion of the file as bits 3,000 through 12,000 for all thumbnail requests.

Because some requests may seek multiple discontinuous portions of a file, multiple ranges may be identified at operation 106. For example, a metadata request may seek a file's author name and file name. Files may store metadata in a particular order; for example, a file's author may be stored at bits 13,384 through 13,415, the file's date of creation may be stored at bits 13,416 through 13,423, and the file's filename may be stored at bits 13,424 through 13,511. Thus, in order to satisfy the example metadata request, operation 106 may include identifying bits 13,384 through 13,415 and bits 13,424 through 13,511.

Once the predicted portions of the file are identified, method 100 further includes downloading the predicted portions at operation 108. This may include, for example, sending a download request to the cloud system for the data identified in operation 106 and downloading the identified data. The downloaded data may be saved to local storage, as will be described in further detail below with reference to FIG. 2. In some embodiments, a "placeholder" file in a directory may be replaced and/or modified based on the downloaded data. In some embodiments, the downloaded data may be saved in a separate cache and existing placeholder files may be left unmodified.

In some embodiments, an additional margin may be added to the identified portions. In other words, operation 108 may include downloading additional data outside the ranges of bits that were predicted to be necessary at operation 106. While this may consume additional resources, the advantageous improvement to fault tolerance may outweigh the cost (for example, if the prediction is incorrect, the data which is actually needed may still be downloaded). Referring to the previous example wherein bits 13,384 through 13,415 and bits 13,424 through 13,511 were identified as necessary, operation 108 may, for example, add an 8-bit margin to one or more ends of the bit ranges. Thus, the system may download, for example, bits 13,376 through 13,415 and bits 13,424 through 13,511 (downloading 8 additional bits situated "before" the predicted range). The system could also download bits 13,384 through 13,519 (downloading the 8 bits between the two ranges as well as 8 bits at the "end" for a total of 16 extra bits).

In some embodiments, margins may be predetermined. For example, in some embodiments a system performing method 100 may always add a 5 kB margin to the download on each end of each range (where possible). In some embodiments, margins may be selected based on a variety of parameters such as the read request classification and/or contextual information. For example, a system may download 3 kB "after" the identified range needed to satisfy a thumbnail request, but may download 1 kB "before" and 15 kB "after" the range predicted to be necessary to satisfy a metadata request. Other bases for margin selection are also possible, as will be understood by one of ordinary skill in the art.

Operation 108 may further include tracking, mapping, or otherwise recording which bits were downloaded. As a clarifying example, if bits 235,016-235,023 and bits 235,032-235,039 were downloaded, these may be saved as bits 1-16 in local storage, but operation 108 may additionally include recording that local bit 1 corresponds to "actual" bit 235,016, local bit 12 corresponds to actual bit 235,035, etc. This may advantageously enable a system performing method 100 to return the correct requested bits, as the read request and subsequent more specific bit requests may "assume" that the full file is being accessed.

In some embodiments, operation 108 may also include throttling or otherwise modifying a download rate based on current network configuration and usage. In some embodiments, operation 108 may include checking whether the predicted data has already been downloaded and is stored locally; if it has, a system performing method 100 may not perform the download.

With the data downloaded (or located), method 100 further includes proceeding as if the full file is available at operation 110. Operation 110 may include, for example, sending an acknowledgment signal to a file explorer application and/or an operating system. The acknowledgment may be configured to "mimic" a typical acknowledgment that a requested file has been located and is ready for reading (such as one sent by, for example, a storage controller).

Thus, the application that sent the read request may proceed as if the full file is available and may respond to the acknowledgement with a second read request containing more specific read instructions (such as, for example, "seek 5,000 bits, then return the next 2,500 bits"). In essence, the prediction made at operation 106 is an attempt to predictively pre-fetch the data that will be accessed by these more specific read instructions. If the predictions were accurate (or had sufficient margins), the system performing method 100 may be able to return the requested bits without performing any additional downloads. Note that, continuing with the "seek 5,000 bits, then return the next 2,500 bits" example, if the "local vs. actual" locations of the bits are tracked as part of operation 108, a system performing method 100 will not need to actually execute the "seek 5,000 bits" instruction. Instead, the system may confirm that bits 5,001-7,500 were downloaded, and proceed to return them if so. Thus, the system may satisfy the read request without needing to download the entire cloud-only file.

If the system determines that the requested bits have not been downloaded (for example, if the prediction of operation 106 was incorrect), one of several different actions may be taken. For example, in some embodiments the system may simply download the entire file. In some embodiments, the system may download the specifically requested bits. These and other responses to an incorrect prediction are described in further detail below (with reference to FIG. 4).

Figure 2:
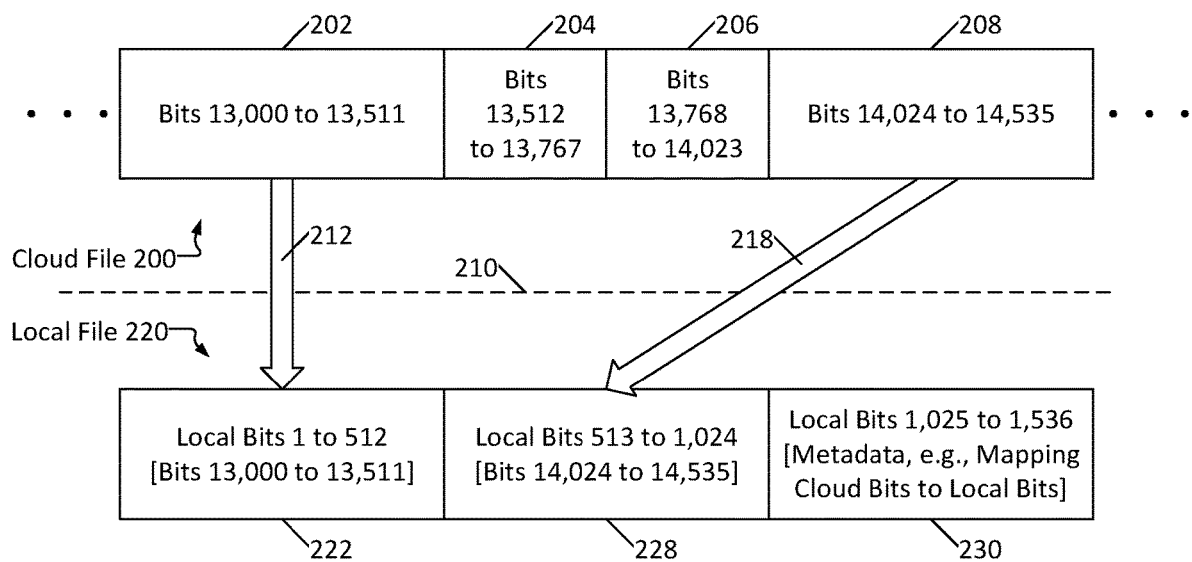
FIG. 2 illustrates block diagrams of an example cloud-stored file and an example locally stored file after downloading identified portions of the cloud-stored file, according to several embodiments of the present disclosure.

FIG. 2 illustrates a block diagram of an example cloud-stored file 200 and an example locally stored file 220 after downloading identified portions 202 and 208 of the cloud-stored file 200, consistent with several embodiments of the present disclosure. Cloud file 200 includes a plurality of bits (i.e., "0" or "1"). At a given point in time, cloud file 200 may be a cloud-only file, in that no complete local copy of file 200 exists. Blocks depicted below dividing line 210 (i.e., blocks 222, 228 and 230) represent bits of a locally stored file 220. Arrows 212 and 218 represent download operations, such as those initiated by a cloud-sync storage application. While two separate arrows 212 and 218 are shown, it is to be understood that they do not necessarily represent two sequential downloads. For example, the downloaded data referenced by those arrows 212 and 218 may be downloaded in a single download operation, or in multiple simultaneous download operation.

Various ranges of bits of local file 220 may contain identical data in comparison to corresponding ranges of bits of cloud file 200. For example, a first range of local bits 222, as a result of a download 212, may be identical to a first range of cloud bits 202, while a second range of local bits 228, as a result of a download 218, may be identical to second range of cloud bits 208. "Identical," as used herein, refers to the logical state of the bits themselves; for example, ranges 202 and 222 may both contain the same bits (e.g., both ranges may be 1000101011010010 and so on).

Not all bits of local file 220 are necessarily copied from cloud file 200; for example, local file 220 may also include metadata such as information mapping which bits of local file 220 correspond to which bits of cloud file 200. In FIG. 2, such metadata is depicted as range 230. Metadata 230 (including mapping of local-cloud bits) may be generated (by, for example, the cloud-sync storage application) upon performing a download such as 212 or 218. Metadata 230 may be updated based on further downloads, deletions, etc.

Local file 220 may be stored on a local storage device such as a hard disk drive (HDD), solid state drive (SSD), volatile memory, etc. Further, in some embodiments, local file 220 may include additional tags and/or metadata depending upon the nature of cloud file 200 and downloaded segments 222, 228.

For example, in at least one embodiment, a local system upon which local file 222 is stored utilizes "thumbnail databases." A "thumbnail database," as used herein, refers to a typically hidden file in a directory containing thumbnail images for files in the directory to enable fast generation of thumbnails. If no thumbnail database in a directory on the example local system exists, the system may generate one (e.g., by pulling frames from video files in the directory, generating small copies of image files in the directory, etc.) and save the new thumbnail database in the directory for future use. In this example embodiment, cloud file 200 may be a video file and local bits 222 may comprise a thumbnail image. Local file 220 may include metadata identifying local file 220 as a typical thumbnail database. Thus, if a file explorer application executing on the system attempts to access the directory, the application will detect local file 220 and will use local bits 222 as a thumbnail for a placeholder file representing cloud file 200. As local file 220 may be generated outside of a read request, this enables a cloud-sync storage application to generate a thumbnail database before a file explorer application accesses a directory.

In some embodiments, local file 220 may include tags and/or metadata (such as in range 230) to cause local file 220 to appear to a user and/or file system as if it is the full cloud file 200. Thus, if an application requests bit ranges 202 and/or 208 ("believing" that it is attempting to read the bits from a complete local copy of cloud file 200), a cloud-sync storage application may be able to satisfy the read requests without downloading the entire cloud file 200.

Depending upon the nature of cloud file 200, differing ranges of bits may store different data; for example, segment 202 (bits 13,000 to 13,511) of file 200 may store a name of an author of file 200, segment 204 (bits 13,512 to 13,767) of file 200 may store a date of creation of file 200, segment 206 (bits 13,768 to 14,023) may store a date on which file 200 was last modified, segment 208 (bits 14,024 to 14,535) may store a filename of file 200, etc. To be clear, the specific ranges of bits depicted in FIG. 2 are for exemplary purposes only; bits 13,000 to 13,511 of a different file (not shown in FIG. 2) may be used for a completely different purpose than storing a name of that different file's author, or indeed may not even exist (i.e., the different file may contain fewer than 13,000 bits).

In some embodiments, a cloud-sync storage application can determine that one or more portions (i.e., one or more bits) of cloud file 200 may need to be downloaded to a local storage device. This may be accomplished in response to detecting a read request directed towards cloud file 200 (such as via operation 102 of method 100, as described with relation to FIG. 1). In some embodiments, the cloud-sync storage application may determine that certain portions of cloud file 200 should be downloaded even in the absence of a read request, for example when the cloud-sync storage application is installed and launched for the first time on a new system, as will be described in further detail below.

Local file 220 may be stored in a cloud-synced directory alongside one or more placeholder files. As described above, a placeholder file may be a locally stored file representing a cloud-only file. Placeholder files may contain minimal metadata in order to enable a file system to track which files are stored on the cloud (for example, if a cloud-only file is permanently deleted or moved to a different directory, a corresponding placeholder file may also be deleted or moved accordingly to indicate to the file system that the file no longer exists in that directory).

In some embodiments, local file 220 may be (or replace) a placeholder file. For example, in some embodiments a cloud-sync storage application may download data from the cloud via download 212 and/or download 218 and modify a preexisting placeholder file to add data corresponding to range 202 and/or 208 to the placeholder file, respectively. In such embodiments, local file 220 is the placeholder file itself.

In some embodiments, local file 220 may be stored in a different directory (e.g., separate from the cloud-synced directory including placeholder files, such as in a compressed archive or database), but may be accessed (by, for example, a cloud-sync storage application) upon detection of a read request directed towards cloud file 200. For example, a cloud-sync storage application may have security privileges enabling it to monitor operations performed by a system executing the cloud-sync storage application. Further, the cloud-sync storage application may be able to intercept certain instructions.

For example, in some embodiments, while monitoring operations performed by a system, the cloud-sync storage application may detect a read request submitted from a file explorer to a storage controller directed toward cloud file 200. In response to detecting this read request, the cloud-sync storage application may intercept the request, access local file 220 (even if local file 220 is stored in an entirely different location on a local drive), and respond to the read request as if it were the storage controller acknowledging possession of cloud file 200. In response to intercepting and responding to the request, the cloud-sync storage application may receive a follow-up request, a more specific request seeking data stored in bits 202 and/or 208, at which point the cloud-sync storage application may return local bits 222 and/or 228, respectively, from local file 220. Thus, the file explorer application may behave as if it just accessed a complete copy of file 200 and had its request fulfilled normally.

A follow-up read request may include instructions in order to direct the recipient as to how to access the desired bits. For example, if a file explorer desires bits 14,024 to 14,535 (range 208), a follow-up read request may instruct a recipient to "seek 14,024 bits and return the following 512 bits." Based on the mapping stored in local bits 230, a cloud-sync storage application may determine that the desired range 208 corresponds to local range 228, and may therefore instead seek 512 bits and return the following 512 bits. Thus, the request may be satisfied and the requested bits returned without needing to download an entire local copy of cloud file 200.

If the follow-up read request includes instructions that indicate that the desired data is not stored in local file 220 (for example, if the follow-up read request instructs "seek 3,000 bits and return the following 4,000 bits" but no local copy of the requested data exists), this may indicate that an earlier prediction of data likely to be requested was incorrect. Several different responses to such a situation exist. For example, in some embodiments the cloud-sync storage application may respond by simply initiating a download of the specifically requested bits (in this example, bits 3,001 to 7,000) from cloud file 200 and returning them upon completion of the download (and possibly also saving the newly-downloaded bits in local file 220 and updating metadata 230 in case that particular data is requested again).

However, there exists a possibility for multiple follow-up requests desiring additional data. While the cloud-sync storage application could, for every request, simply check for the requested data and download it if necessary, initiating a download of data from the cloud has a nonzero resource footprint. The computational cost of initiating dozens of minor downloads may quickly consume more time and resources than simply downloading the entire file all at once. In addition, if an earlier prediction failed to result in downloading the now-desired data, this may indicate that the prediction was incorrect and/or misinformed, increasing the likelihood that additional follow-up requests will call for data that is not present in local file 220. Therefore, in some embodiments, if a follow-up request calls for data that is not contained in local file 220, the cloud-sync storage application may respond by initiating a download of the entire cloud file 200. In some embodiments, the cloud-sync storage application may also update one or more definitions or parameters to represent that the previous prediction was incorrect.

Figure 3:
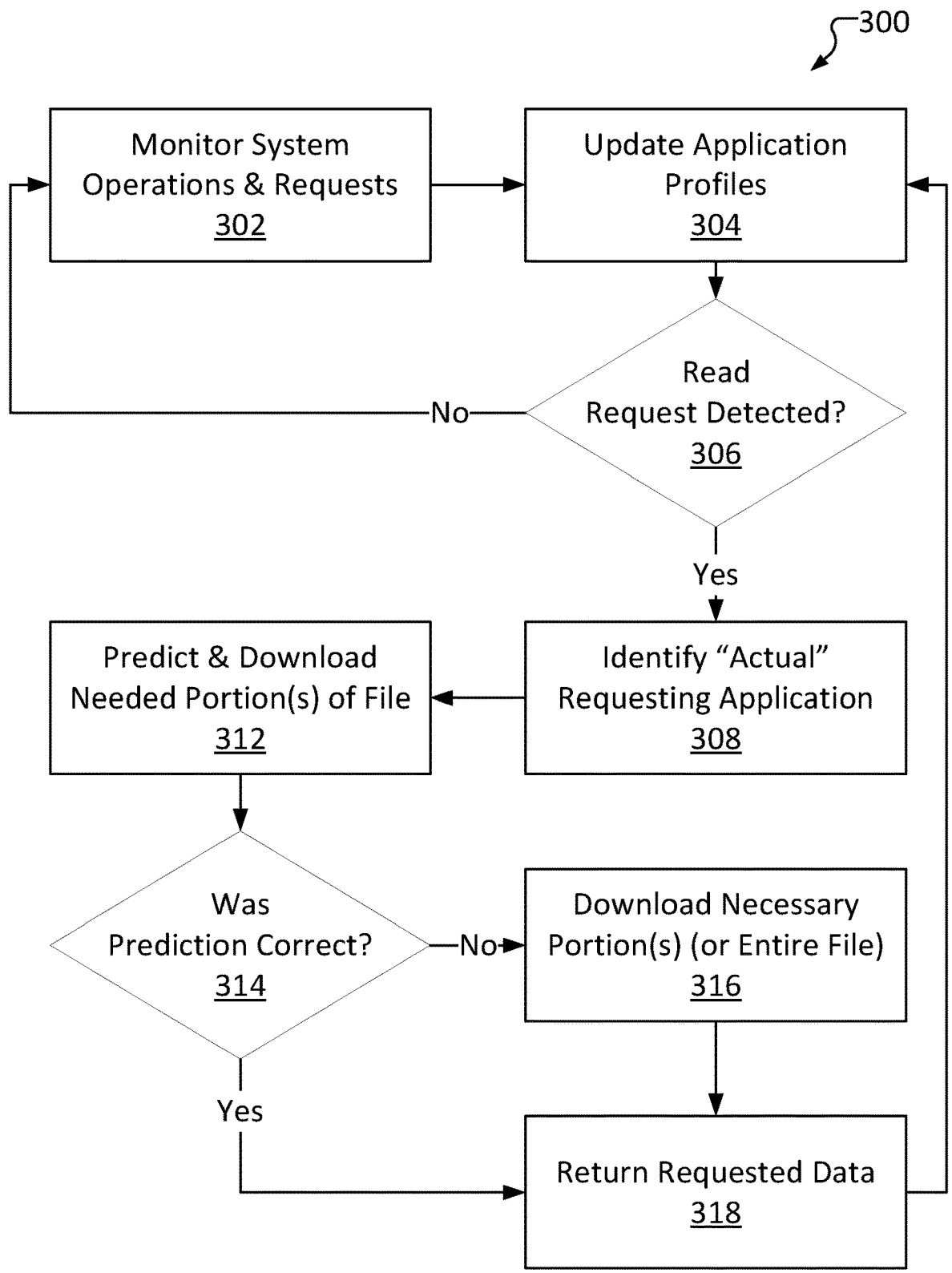
FIG. 3 illustrates a method of identifying an application responsible for initiating a read request, consistent with several embodiments of the present disclosure.

FIG. 3 illustrates a method 300 of identifying an application responsible for initiating a read request, consistent with several embodiments of the present disclosure. Method 300 may be performed, for example, by a cloud-sync storage application executing on a client system. In general, method 300 describes tracking patterns of various system operations and calls over time, maintaining profiles of various applications based on these operations, and leveraging this information to attempt to identify an application initiating a read request (enabling a more accurate request classification/prediction of desired data).

Method 300 includes monitoring system operations and requests at operation 302. Operation 302 may include, for example, tracking calls (including associated data such as signature hashes as well as what is returned in response to the call). Method 300 also includes maintaining and updating application profiles at operation 304. This may include, for example, keeping a database containing profiles of known applications and libraries. A given profile can be made up by application/library name, known file paths, known file signature hashes (message-digest (MD)5, secure hash algorithm (SHA)1, SHA256, etc.), exported functions (for libraries), function signatures and names, and call sequences. In addition, for each application and/or library, operation 304 may further include connecting given requests from the application and/or library with a location or part of a file. For example, operation 304 may include recording a file path of an application, its size, one or more calls/requests most frequently submitted by the application, as well as which parts of a given file are being requested (e.g., "always the first 512 bytes").

Method 300 further includes determining whether a read request has been detected at operation 306. Operation 306 may include, for example, analyzing a monitored operation to determine whether the operation comprises a read request. If no read request has been detected (306 "No"), method 300 may continue monitoring and updating its application profiles (via returning to operations 302 and 304). If a read request is detected (306 "Yes"), method 300 further includes identifying which application is responsible for the request at operation 308. Note that while a request may include information labeling an application responsible for the request, this may not always be the case. Further, even if the request does include this information, it may be misleading. For example, if a user of a system is using an image editing application and desires to open an image file, the image editing application may launch an embedded instance of a file explorer application to enable the user to browse files. If the embedded file explorer application attempts to access a file in order to generate a thumbnail for a file in a particular directory, this may be detected as a read request (306 "Yes") for the file in question, but the request itself may include a signature indicating that it is originating from the image editing application. Operation 308 may include leveraging the profiles maintained at operation 304 to determine that the "actual" requesting application is the file explorer application (which is more likely to be attempting to generate a thumbnail, while the image editing application is more likely to require opening an entire file).

Operation 308 may consider high-confidence identifiers, such as checksums or signature hashes, before considering relatively lower-confidence identifiers, such as the file path, size or behavior to determine which profile is the best match (and therefore which application initiated the request). In some embodiments, if a high-confidence match is found (e.g., a signature in the request matches that contained in a profile), operation 308 may end its analysis.

In some embodiments, if no profiles match the request or if no profiles are within a specific threshold of similarity, operation 308 may conclude that no match was found. In some embodiments, if no match is found, the entire targeted file may be downloaded. However, in some embodiments, if no profiles match the request, operation 308 may select a "closest match" profile.

Method 300 further includes predicting and downloading portions of a file at operation 312. Operation 312 may include, for example, identifying (based on the identified profile) a segment of a file that is likely to be needed in order to satisfy the read request, as well as downloading that segment (if a local copy does not yet exist). Operation 312 may further include responding to the request to indicate that the full file is available and ready to be read, even if only a relatively small portion of the file (i.e., the predicted portion) has been acquired.

Note that operation 312 may include downloading one or more additional margins or extra data beyond the portions predicted to be necessary. For example, even if the identified profile strongly indicates that the true target of the request is a specified range of bits, operation 312 may include downloading that range but also an additional 1,024 bits before and/or after the specified range. Further, operation 312 may include downloading predetermined ranges regardless of prediction; for example, in some embodiments, operation 312 may include downloading the first and/or last 4,096 bits of any file, even if those bits are not specifically expected to be necessary. While this may consume additional resources, some portions of files are commonly requested regardless of application/request, so in some embodiments this may be considered a worthwhile trade-off.

Method 300 further includes determining whether the prediction was correct at operation 314. Operation 314 may include, for example, analyzing a follow-up read request to determine which portion(s) of the file in question are actually needed, and comparing the needed portion(s) to the downloaded portion(s). If the prediction was correct (314 "Yes") and the needed portions of the file were downloaded, method 300 further includes returning the requested data at operation 318.

If the predication was incorrect (such as if the necessary portions were not downloaded, 314 "No"), method 300 further includes downloading the portion(s) of the file necessary to satisfy the request at operation 316. In some embodiments, operation 316 may include downloading the entire file. In some embodiments, operation 316 may include only downloading the missing portions of the file.

In some embodiments, operation 316 may include comparing the now-known necessary portions to the application profiles to determine if a different profile matches more closely based on this additional information, and if so, downloading any additional data that the new profile indicates may also be necessary. For example, if at operation 308, a first profile was selected as a best match, but at operation 314 this prediction is discovered to have been incorrect, operation 316 may include searching the profiles again to determine if a second profile is a better match in view of the additional information. If a second match is found, operation 316 may further include downloading any remaining missing portions likely to be necessary based on the second profile. In some embodiments, operation 316 may simply include downloading the entire file.

Upon downloading the needed portions of the file (either at operation 312 or, if the prediction was incorrect, at operation 316), method 300 further includes returning the requested data at operation 318. Operation 318 may include returning portions of a local file that correspond to the requested portions of a cloud-only file, advantageously enabling a system performing method 300 to satisfy the request without downloading the entire file from the cloud.

Upon returning the requested data, method 300 may return to operation 304 to update the database of profiles based on the results of operation 314 (and, if necessary, operation 316). For example, if the initial download successfully captured the necessary data but only because it was included in a margin (meaning the prediction itself was still inaccurate), this information may be used to update the associated profile. In some embodiments, operation 304 may include updating various weights of profiles based on contextual information surrounding the request. If the prediction was incorrect (314 "No"), operation 304 may include updating the selected profile (as well as a possible second, "actually correct" profile) based on the error. In some embodiments, operation 304 may include creating a new profile based on the necessary portion(s) of the file.

Figure 4:
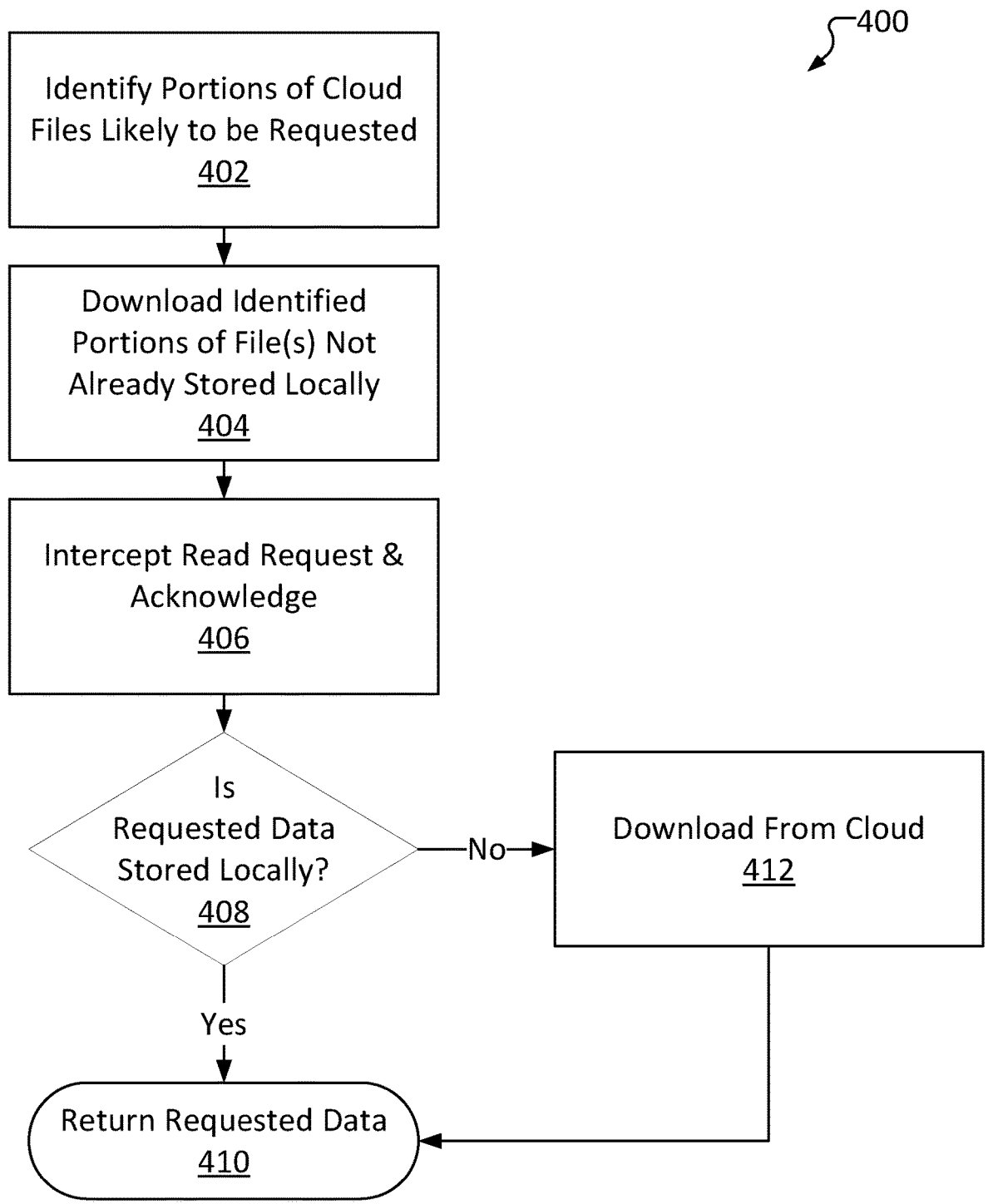
FIG. 4 illustrates a method of predictively provisioning cloud-synced files, consistent with several embodiments of the present disclosure.

FIG. 4 illustrates a method 400 of predictively provisioning cloud-synced files consistent with several embodiments of the present disclosure. Method 400 includes identifying portions of cloud files likely to be requested at operation 402. Operation 402 may include, for example, analyzing files stored on a cloud system as well as system configuration information such as, for example, identities of various applications installed and/or executed on a computing system, uptime, identity of a user of the computing system, or an organization or entity controlling the computing system (such as a business and/or workplace). In some embodiments, the system configuration information may be compared to stored profiles. Operation 402 may include leveraging this information to predict portions of one or more files that are likely to be subject to a read request. For example, if one of the files stored on the cloud system is a video file, operation 402 may conclude that a particular frame of the video is likely to be requested in order to generate a thumbnail.

Operation 402 may include analyzing portions of the cloud files to determine a likeliness rating for some or all of the data contained in the files. In some embodiments, operation 402 may include identifying a most likely portion of the file having a relative maximum likeliness rating. In some embodiments, operation 402 may only identify a portion as "likely" to be requested if the likeliness rating is above a specific threshold. In some embodiments, operation 402 may include identifying a "top 3" most likely portions, etc. In some embodiments, operation 402 may consider size of some or all of the portions of the file in addition to their likeliness ratings to determine whether the portion is worth downloading.

Notably, operation 402 may be performed with or without having intercepted or detected a read request. A system may perform operation 402, for example, upon being installed on a new machine and/or device, upon detecting a newly linked cloud system or new files being added to an existing cloud, upon being prompted (such as by a user), while executing in the background (possibly waiting for relative downtime), upon detecting installation of a new application, upon startup, etc.

Method 400 further includes downloading identified portions of files that are not already stored locally at operation 404. Operation 404 may include, for example, checking one or more directories and/or files to determine if the portions predicted to be needed are already present in local storage and downloading some or all portions that are not found in local storage.

In some embodiments, operation 404 may include excluding downloading one or more of the identified portions in view of system settings. For example, if a cloud video file has a size of 5 GB but operation 402 identified that a specific 1 GB segment of the video is likely to be requested, downloading even the 1 GB segment may still consume significant bandwidth and storage. Thus, various settings are considered which may restrict, throttle, or cap such downloads unless the file in question (or segment thereof) is explicitly requested.

The portions may be saved to one or more files. In some embodiments, all identified portions may be bundled into a single "bulk" download and saved as a single file with metadata mapping bits (or ranges thereof) of the bulk file to corresponding bits (or ranges thereof) of the cloud file. Thus, when data is requested, a system performing operation 400 may search the bulk file to determine whether the requested data has been downloaded (rather than checking multiple different files).

Method 400 further includes intercepting and acknowledging a read request at operation 406. Operation 406 may include, for example, monitoring system operations and determining that a read request has been sent. A system performing method 400 may have permissions enabling the system to observe and intercept interactions between applications and lower-level file systems. Upon detecting a read request, operation 406 may include responding with an acknowledgment (such as communicating to the sender of the request that the requested file is available for reading), regardless of whether or not the requested file is stored locally.

Method 400 further includes determining whether requested data is stored locally at operation 408. Operation 408 may include, for example, receiving a follow-up to the acknowledged read request specifying particular data being requested. Operation 408 may include comparing the specified data of the targeted files to contents of one or more locally stored files (such as those located or downloaded at operation 404).

If operation 408 results in locating the requested data in local storage (408 "Yes"), method 400 further includes returning the requested data at operation 410, advantageously satisfying the read request with the correct data despite not having downloaded a local copy of the targeted file from the cloud. If the requested data is not found (408 "No"), method 400 further includes downloading the data from the cloud at operation 412. In some embodiments, operation 412 may include downloading the entire targeted file to local storage. In some embodiments, operation 412 may include downloading only one or more portion(s) of the targeted file (such as those containing the requested data). Once the requested data has been acquired at operation 412, method 400 proceeds to operation 410, returning the requested data in response to the request.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
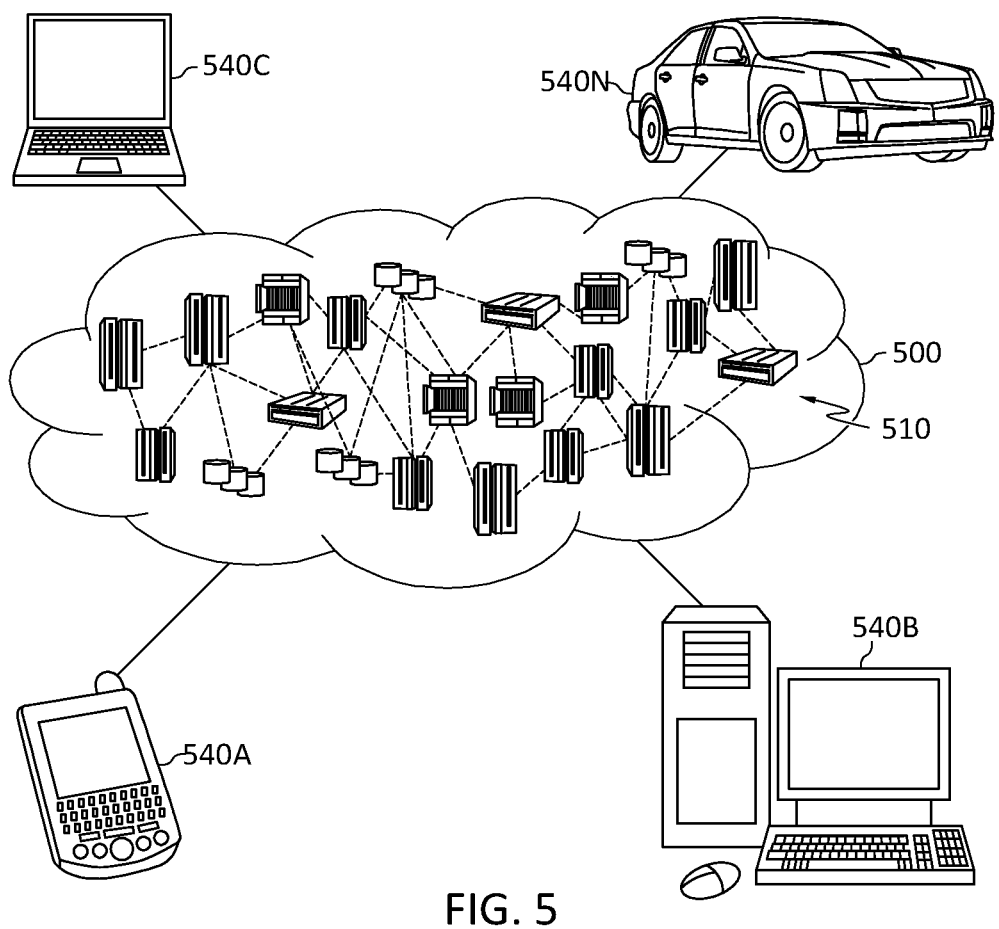
FIG. 5 depicts a cloud computing environment according to an embodiment of the present disclosure.

Referring now to FIG. 5, illustrative cloud computing environment 500 is depicted. As shown, cloud computing environment 500 comprises one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 5 are intended to be illustrative only and that computing nodes 510 and cloud computing environment 500 can communicate with any type of computerized device over any type of network and/or network addressable connection (e.g., using a web browser).

Figure 6:
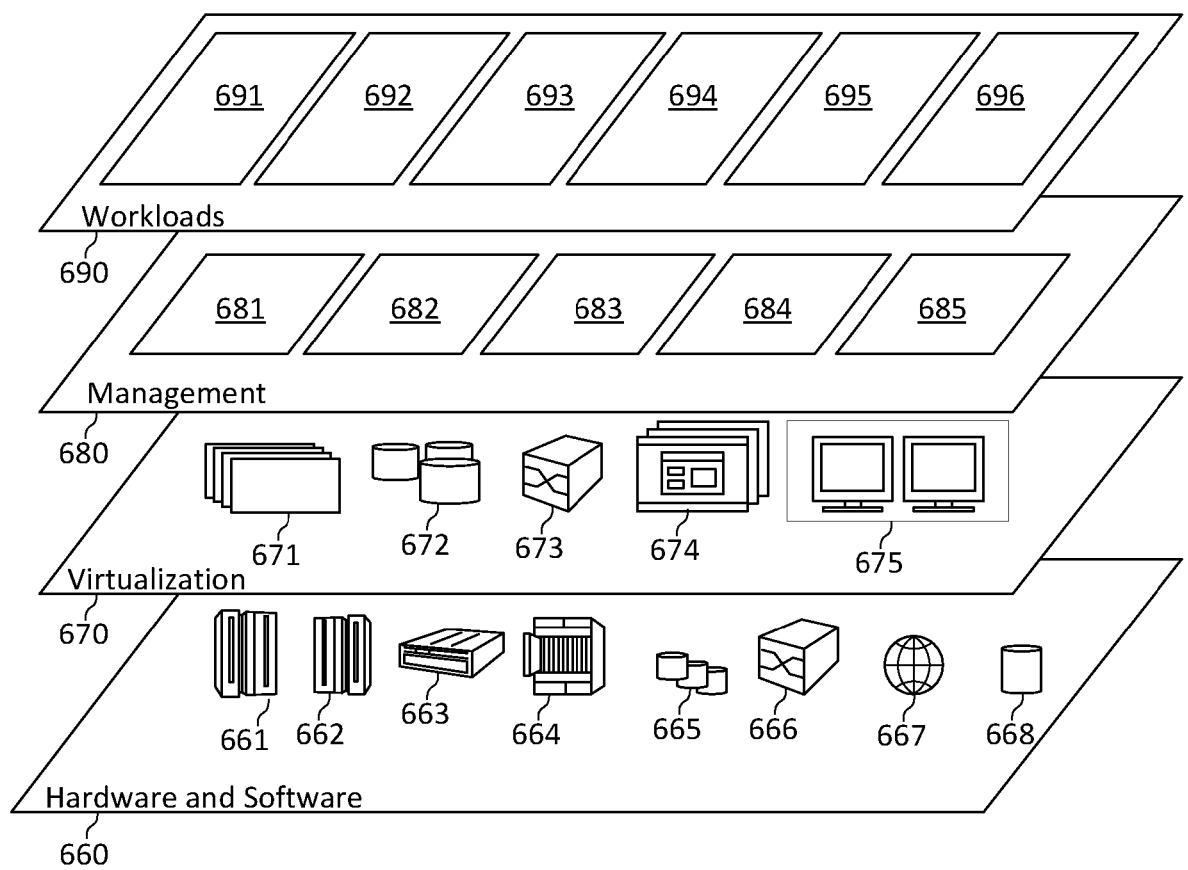
FIG. 6 depicts abstraction model layers according to an embodiment of the present disclosure.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and predictive provisioning of cloud-stored files 696.

Figure 7:
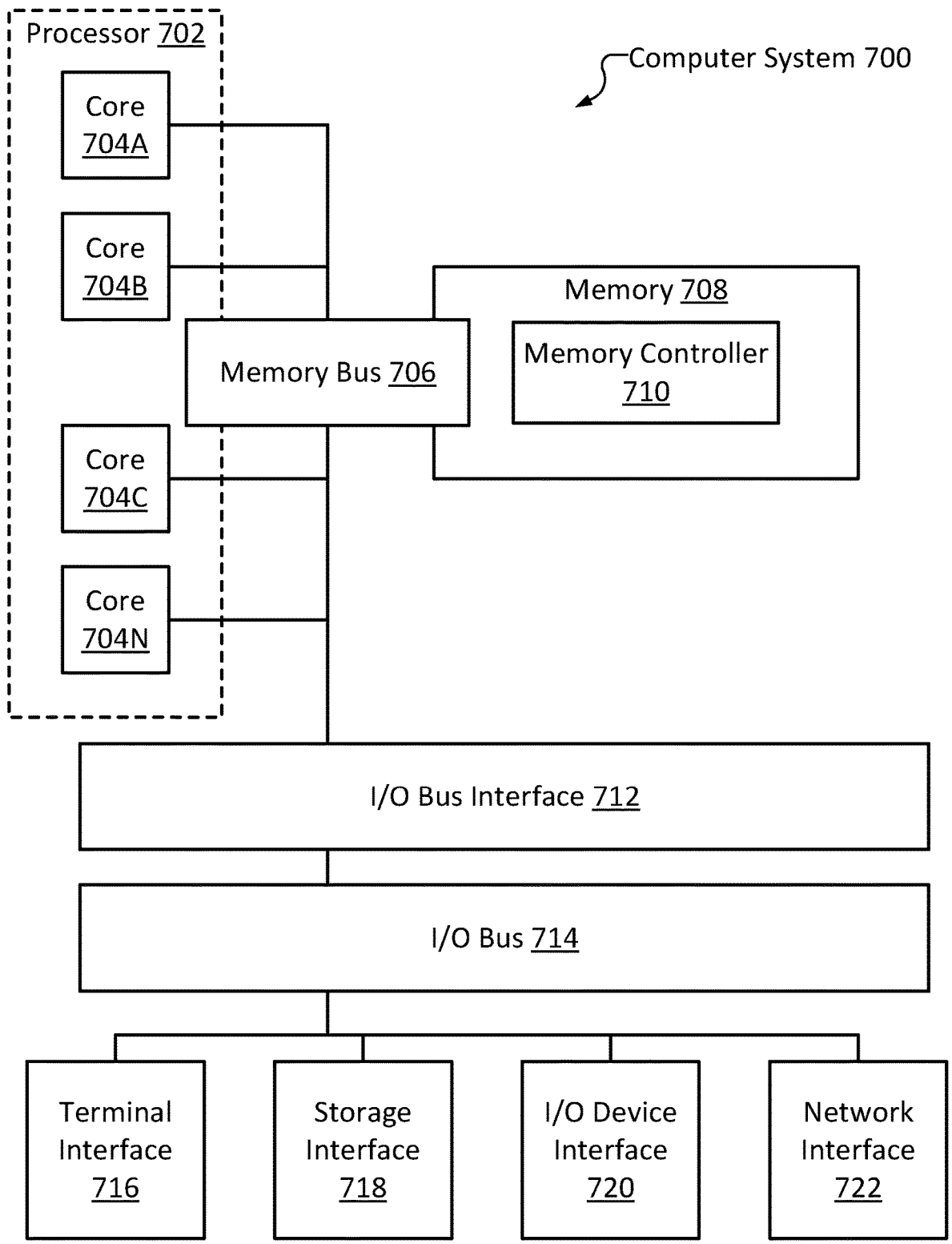
FIG. 7 illustrates a high-level block diagram of an example computer system that may be used in implementing embodiments of the present disclosure.

Referring now to FIG. 7, shown is a high-level block diagram of an example computer system 700 that may be configured to perform various aspects of the present disclosure, including, for example, methods 100, 300 and 400, respectively. The example computer system 700 may be used in implementing one or more of the methods or modules, and any related functions or operations, described herein (e.g., using one or more processor circuits or computer processors of the computer), in accordance with embodiments of the present disclosure. In some embodiments, the major components of the computer system 700 may comprise one or more CPUs 702, a memory subsystem 708, a terminal interface 716, a storage interface 718, an I/O (Input/Output) device interface 720, and a network interface 722, all of which may be communicatively coupled, directly or indirectly, for inter-component communication via a memory bus 706, an I/O bus 714, and an I/O bus interface unit 712.

The computer system 700 may contain one or more general-purpose programmable central processing units (CPUs) 702, some or all of which may include one or more cores 704A, 704B, 704C, and 704D, herein generically referred to as the CPU 702. In some embodiments, the computer system 700 may contain multiple processors typical of a relatively large system; however, in other embodiments the computer system 700 may alternatively be a single CPU system. Each CPU 702 may execute instructions stored in the memory subsystem 708 on a CPU core 704 and may comprise one or more levels of on-board cache.

In some embodiments, the memory subsystem 708 may comprise a random-access semiconductor memory, storage device, or storage medium (either volatile or non-volatile) for storing data and programs. In some embodiments, the memory subsystem 708 may represent the entire virtual memory of the computer system 700 and may also include the virtual memory of other computer systems coupled to the computer system 700 or connected via a network. The memory subsystem 708 may be conceptually a single monolithic entity, but, in some embodiments, the memory subsystem 708 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 702. This may include a memory controller 710.

Although the memory bus 706 is shown in FIG. 7 as a single bus structure providing a direct communication path among the CPU 702, the memory subsystem 708, and the I/O bus interface 712, the memory bus 706 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 712 and the I/O bus 714 are shown as single respective units, the computer system 700 may, in some embodiments, contain multiple I/O bus interface units 712, multiple I/O buses 714, or both. Further, while multiple I/O interface units are shown, which separate the I/O bus 714 from various communications paths running to the various I/O devices, in other embodiments some or all of the I/O devices may be connected directly to one or more system I/O buses.

In some embodiments, the computer system 700 may be a multi-user mainframe computer system, a single-user system, or a server computer or similar device that has little or no direct user interface but receives requests from other computer systems (clients). Further, in some embodiments, the computer system 700 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 700. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   identifying a remote file stored on a remote computing system;
   predicting that a predicted portion of the remote file is likely to be subject to a future read request;
   downloading the predicted portion of the remote file to a local file; and
   updating metadata of the local file to map a local portion of the local file to the predicted portion of the remote file, wherein the local file is configured to appear to a file system as if the local file is a full copy of the remote file.

2. The method of claim 1, further comprising receiving a first read request, wherein:
   the identifying is based at least on a target of the first read request; and
   the predicting is based at least on the first read request.

3. The method of claim 2, further comprising determining, based at least on an application profile database, a requesting application that initiated the first read request, wherein the predicting is further based at least on the requesting application.

4. The method of claim 3, further comprising:
   receiving a second read request targeting a targeted portion of the remote file; and
   updating the application profile database based at least on the predicted portion and the targeted portion.

5. The method of claim 1, further comprising:
   receiving a second read request targeting a targeted portion of the remote file;
   determining that the predicted portion of the remote file includes the targeted portion; and
   responsive to the determination that the predicted portion includes the targeted portion, returning, based on the metadata, at least part of the local portion mapped to the predicted portion.

6. The method of claim 1, further comprising:
   receiving a second read request targeting a targeted portion of the remote file;
   determining that the predicted portion of the remote file does not include the targeted portion; and
   downloading, responsive to the determination that the predicted portion does not include the targeted portion, at least a second portion of the remote file including the targeted portion.

7. The method of claim 1, further comprising monitoring read operations of a computing system, wherein the predicting is based at least on the monitoring.

8. The method of claim 1, wherein the predicting is based at least on system configuration information.

9. The method of claim 1, wherein:
   the remote computing system is a cloud computing system; and
   the remote file is a cloud file.

10. A system comprising:
    a memory; and
    a central processing unit (CPU) including one or more CPU cores configured to:
      identify a remote file stored on a remote computing system;
      predict that a predicted portion of the remote file is likely to be subject to a future read request;
      download the predicted portion of the remote file to a local file; and
      update metadata of the local file to map a local portion of the local file to the predicted portion of the remote file, wherein the updated metadata of the local file further causes the local file to appear to a file system as if the local file is the remote file.

11. The system of claim 10, wherein the CPU is further configured to receive a first read request, wherein:
    the identifying is based at least on a target of the first read request; and
    the predicting is based at least on the first read request.

12. The system of claim 11, wherein the CPU is further configured to determine, based at least on an application profile database, a requesting application that initiated the first read request, wherein the predicting is further based at least on the requesting application.

13. The system of claim 12, wherein the CPU is further configured to:
    receive a second read request targeting a targeted portion of the remote file; and
    update the application profile database based at least on the predicted portion and the targeted portion.

14. The system of claim 10, wherein the CPU is further configured to:
- receive a second read request targeting a targeted portion of the remote file;
- determine that the predicted portion of the remote file includes the targeted portion; and
- responsive to the determination that the predicted portion includes the targeted portion, return, based on the metadata, at least part of the local portion mapped to the predicted portion.

15. The system of claim 10, wherein the CPU is further configured to:
- receive a second read request targeting a targeted portion of the remote file;
- determine that the predicted portion of the remote file does not include the targeted portion; and
- responsive to the determination that the predicted portion does not include the targeted portion, download at least a second portion of the remote file including the targeted portion.

16. The system of claim 10, wherein the CPU is further configured to monitor read operations of the system, wherein the predicting is based at least on the monitoring.

17. The system of claim 10, wherein:
- the remote computing system is a cloud computing system; and
- the remote file is a cloud file.

18. A computer program product, the computer program product comprising a computer readable storage medium having program instructions embodied therewith, the program instructions executable by a computer to cause the computer to:
- identify a remote file stored on a remote computing system;
- predict that a predicted portion of the remote file is likely to be subject to a future read request;
- download the predicted portion of the remote file to a local file;
- update metadata of the local file to map a local portion of the local file to the predicted portion of the remote file; and
- present the local file to a file system as if the local file is a full copy of the remote file.

19. The computer program product of claim 18, wherein the instructions further cause the computer to receive a first read request, wherein:
- the identifying is based at least on a target of the first read request; and
- the predicting is based at least on the first read request.

20. The computer program product of claim 19, wherein the instructions further cause the computer to determine, based at least on an application profile database, a requesting application that initiated the first read request, wherein the predicting is further based at least on the requesting application.

21. The computer program product of claim 20, wherein the instructions further cause the computer to:
- receive a second read request targeting a targeted portion of the remote file;
- determine that the predicted portion of the remote file includes the targeted portion; and
- responsive to the determination that the predicted portion includes the targeted portion, return, based on the metadata, at least part of the local portion mapped to the predicted portion.

22. The computer program product of claim 18, wherein the instructions further cause the computer to:
- receive a second read request targeting a targeted portion of the remote file;
- determine that the predicted portion of the remote file does not include the targeted portion; and
- responsive to the determination that the predicted portion does not include the targeted portion, download at least a second portion of the remote file including the targeted portion.

23. The computer program product of claim 22, wherein the second portion of the remote file comprises an entirety of the remote file.

24. The computer program product of claim 18, wherein the instructions further cause the computer to monitor read operations of the computer, wherein the predicting is based at least on the monitoring.

25. The computer program product of claim 18, wherein:
- the remote computing system is a cloud computing system; and
- the remote file is a cloud file.

* * * * *